Jan. 1, 1935.  F. H. OWENS  1,986,522
MOTION PICTURE CAMERA
Filed June 25, 1930   4 Sheets-Sheet 1

INVENTOR.
FREEMAN H. OWENS.
BY Philip S. Hopkins
ATTORNEY

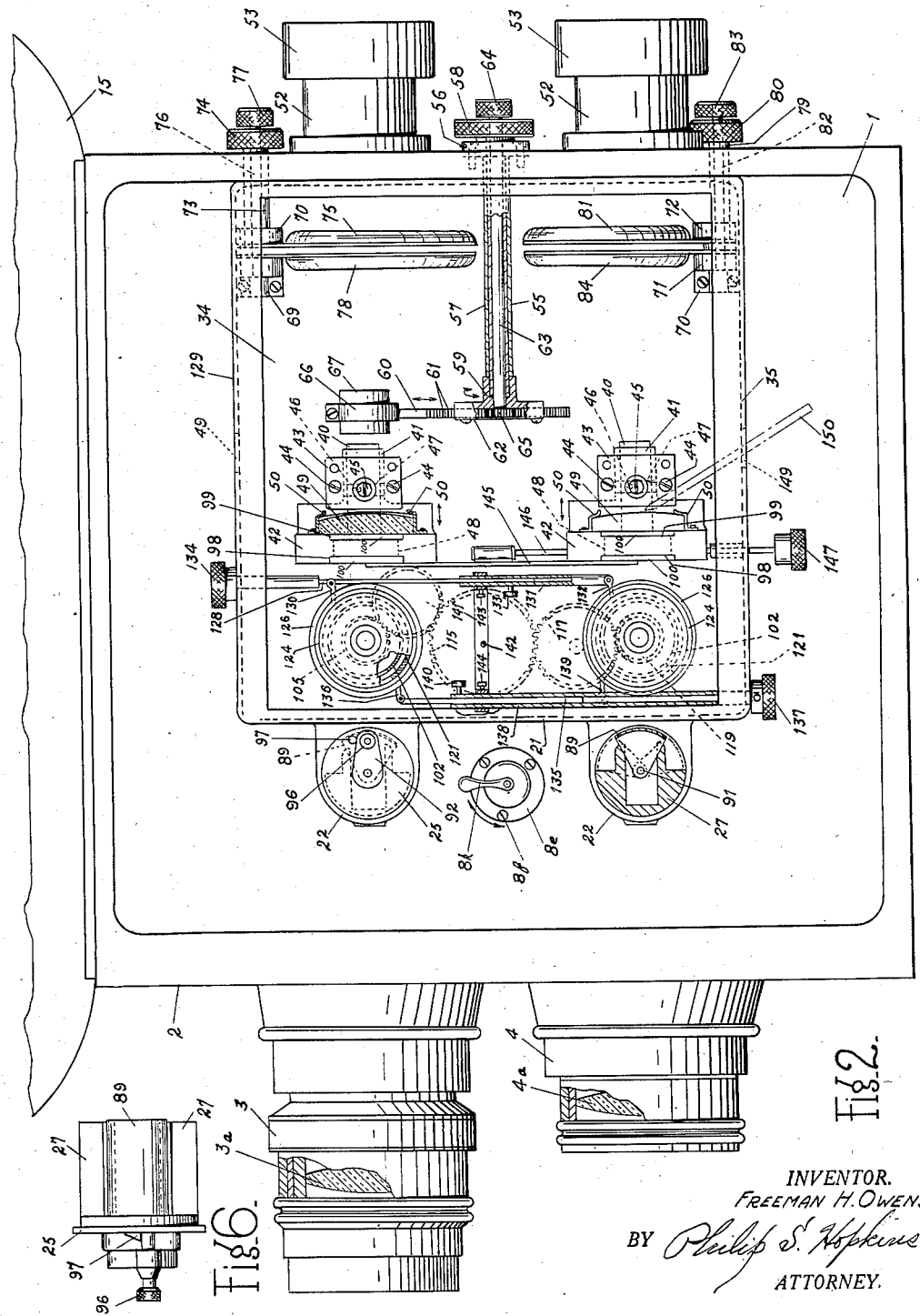

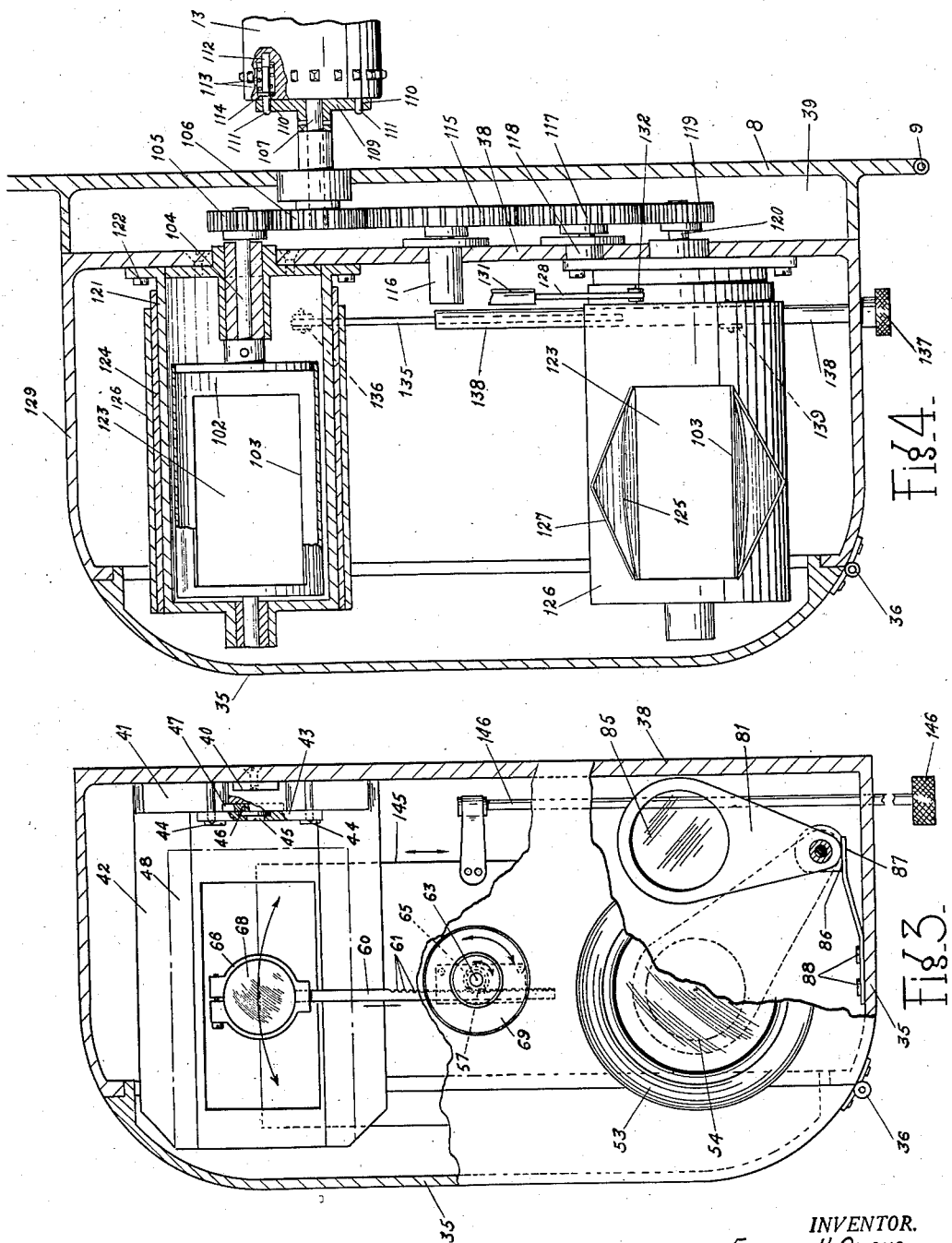

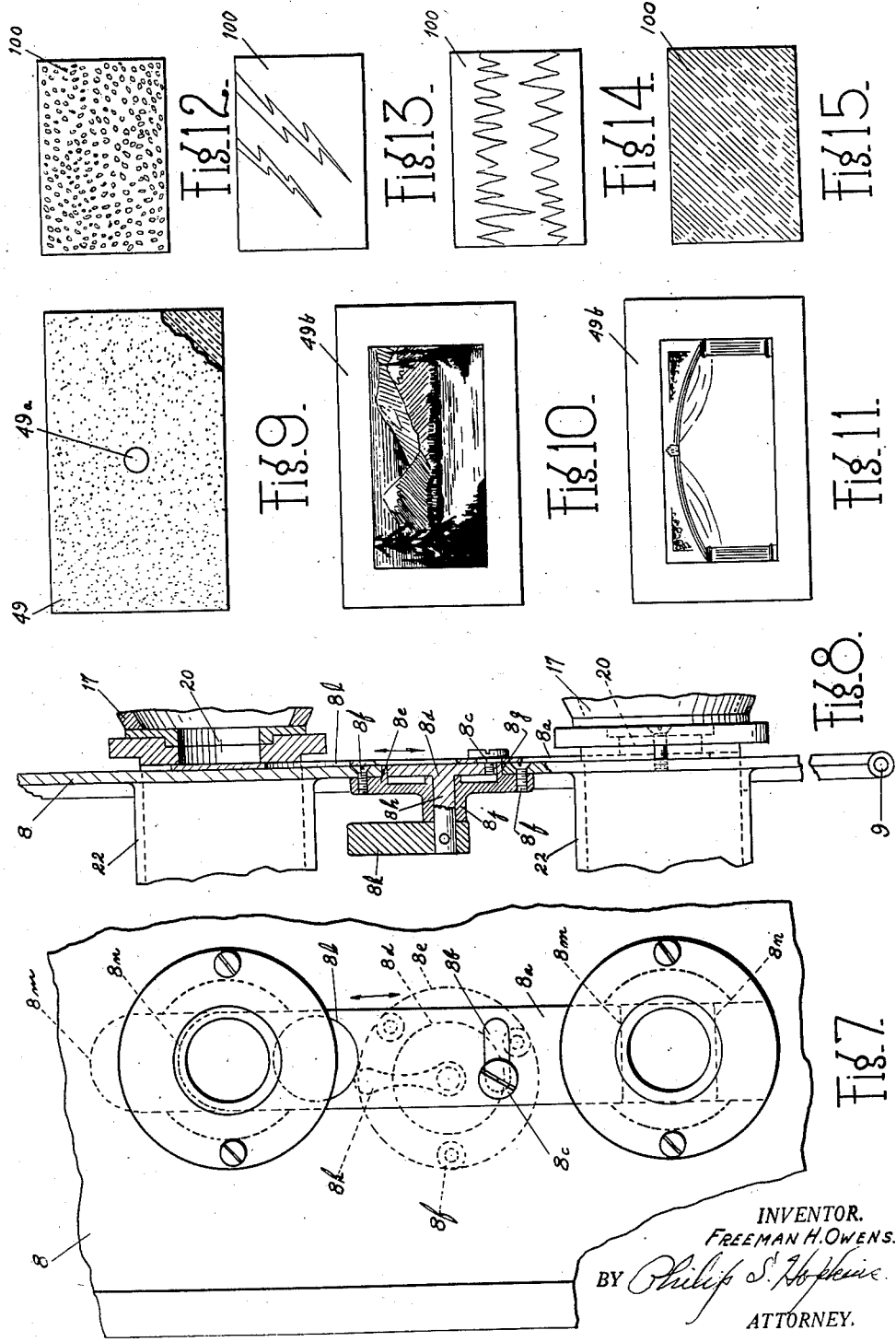

Patented Jan. 1, 1935

1,986,522

UNITED STATES PATENT OFFICE 1,986,522

MOTION PICTURE CAMERA

Freeman H. Owens, New York, N. Y.

Application June 25, 1930, Serial No. 463,666

21 Claims. (Cl. 88—16)

My invention relates to motion picture cameras and particularly to a camera of this type provided with features which will enable the cameramen in photographing scenes of a motion picture, to produce "effects" as the picture is being made, which heretofore have required double exposure, double printing, and other time requiring and expensive operations to secure the desired results.

My invention includes many improved features and advantages over motion picture cameras now in common use and certain of these will now be pointed out specifically and described in some detail.

One of the principal features and advantages of my invention lies in the provision of an optical system for motion picture cameras which serves a twofold purpose, namely, it provides means for focusing through the film and with the image presented to the eye right side up and of the same size as the film "frame", and secondly it provides a means for photographing from the rear side of the film certain desired scenes, masks, mats or the like, which it may be desired to incorporate upon the film at the same time and with the normal scene being photographed through the regular or main lens of the camera.

Another important feature and object of my invention is to adapt such an optical system to a double lens camera wherein two lenses of different focal length, positioned in vertical alignment with each other, are used either independently or simultaneously, the optical system and "effect" mechanism being operable with both lenses and capable of independent operation or simultaneous use with either.

Another object and advantage of my invention lies in the provision of a novel scanning magnifier for use with focusing means for each lens, which permits a high degree of magnification of a portion of the image being photographed in order to insure perfectly sharp focus.

A further object lies in the provision of a removable focusing glass or screen of the "ground glass" type, with a clear spot therein for extra sharp focusing.

Another object of my invention, and an important one, lies in the provision of means whereby the focusing screens or ground glasses for each of the lenses may be easily removed and replaced with scenes, mats, masks or other devices, and illuminated for the purpose of photographing the same on to the film from the back side, at the same time it is being exposed from the front. Coupled with this object is that of providing additional means for supplying mats, masks, etc. ancillary to or comprising a part of the supplemental scene to be photographed.

A still further object lies in the provision of novel shutter devices cooperating with the optical systems for intermittently photographing the scenes on the film.

A further object arises in connection with these shutters, namely that of providing manually operated curtain shutters or dissolving means for the supplemental exposure apertures. In this connection, means are provided for the individual operation of such curtain shutters or for the operation of said shutters for both lenses simultaneously.

Another object lies in the provision of a novel viewing shutter which may be raised to permit a momentary view of the supplemental scene being photographed, or the photos through the film and then closed upon release of the manipulating device, or which may be left open for an indeterminate period.

Still another object of my invention lies in the provision of a sliding shutter or curtain device providing means which upon operation will serve to cover one auxiliary exposure aperture and open the other and vice versa, the effective edges of which shutter may be of any desired angle, curvature or shape.

A further object lies in the provision of a safety shutter positioned between the film and the optical system above mentioned, whereby the passage therebetween may be closed against the entrance of dirt, dust, moisture, etc.

Another object lies in the provision of a novel driving connection automatically effective between a driven member of the camera proper and the driving means for the auxiliary shutters, and automatically assuming operative engagement when the mechanism is moved to operating position on the camera.

Another object lies in the novel arrangement of color screens for the focusing devices whereby the operator may at the time of focusing determine the exposure light values for certain scenes in connection with the type of film which he is using.

Still another object lies in the provision of means whereby a pointer or other object may be introduced through the camera for cooperation with the auxiliary mats of "scenes" being photographed through the back of the film, and photographed therewith.

Many other detailed objects and advantages in construction and operation will be apparent as the description proceeds, reference now being had to the figures of the accompanying drawings forming a part of this application, and wherein like reference numerals indicate like parts.

It will be understood from the foregoing and from the description to follow that all the various auxiliary devices incident to the optical systems and the supplementary shutters and photographing means, lend themselves to the securing of many "effects" and so-called "trick" pictures at the same time the principal scene is being photographed, and with the same camera, without the necessity of double exposing or re-exposing or double printing or other practices now necessary in order to secure the "effects" desired. An attempt herein to describe all of the various "effects" which can be produced with a camera equipped with my invention, would be a mere recitation of the dozens of uses to which the camera may be put and all of which are functional and contribute to the general usefulness of the camera. Some of these "effects" will be mentioned as the description proceeds, but it is not deemed necessary to include herein a detailed list of all that may be performed or accomplished with this camera.

In the drawing:—

Figure 2 is a side view of a motion picture camera equipped with my invention, certain parts being removed and certain other parts being shown in section for clearness of illustration.

Figure 3 is a detail rear end view, partly in section and partly broken away, illustrating certain features of my invention.

Figure 4 is a detail sectional view from the rear, illustrating certain features of my invention and including the driving connection between the supplementary shutters and the driven part of the camera.

Figure 6 is a detail view of one of the shutter devices and its operating means.

Figure 7 is a detail front view of the "safety" shutter.

Figure 8 is a side view thereof, partly in section.

Figure 9 is a front view of a type of focusing glass or screen which may be used with my camera.

Figures 10 and 11 are front views illustrative of the scene frames adapted for photographing through the back of the film.

Figures 12, 13, 14 and 15 are front views illustrative of the mats or masks which may be used in connection with photographing through the back of the film.

Figure 1:
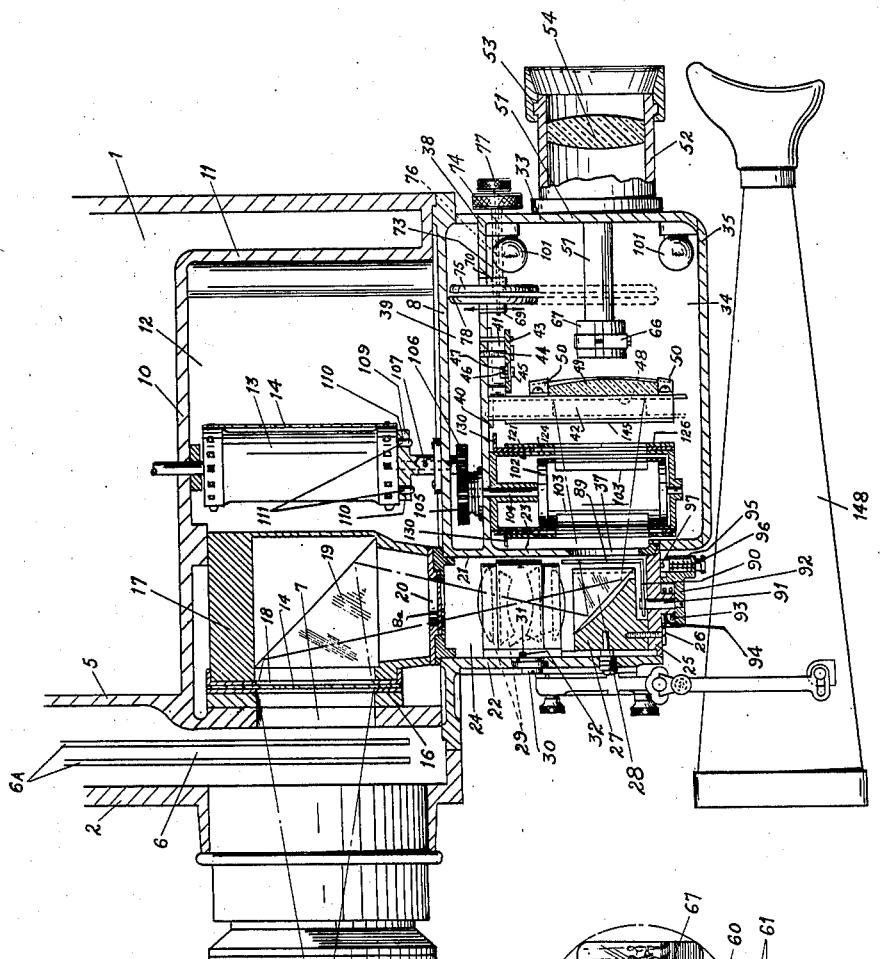
Figure 1 is a top plan view, largely in section, illustrating a portion of a motion picture camera equipped with my invention and showing clearly one of the optical systems in cooperation with its appropriate camera lens and exposure aperture, together with the auxiliary shutters and other parts incidental thereto.

The reference character 1 refers generally to the camera casing provided with a front wall 2 upon which are mounted the two vertically aligned lens mounts 3 and 4 equipped with suitable lenses 3ª and 4ª, preferably one of relatively short focal length and the other of relatively long focal length.

The camera 1 is provided with a partition member 5 toward its front side and spaced rearwardly of the front wall 2 to provide the space 6 for the usual revolving shutters 6ª which serve to intermittently cut off the light through the lenses. These shutters are of the "dissolving" type such as clearly shown and described in my Patent No. 1,936,206, issued Nov. 21, 1933.

In this wall 5, and located in alignment with the lenses 3ª and 4ª are exposure apertures, one of which is indicated clearly in Figures 1 and 3 at 7.

A side door 8, hinged to the camera as at 9 (see Figure 4) serves to close one side of the camera, and it is upon this door 8 that most of the mechanism forming a part of my invention is mounted, in a manner as will be more clearly apparent as the description proceeds.

A partition 10 extends from the partition 5 rearwardly of the camera to a point spaced inwardly a short distance from the rear wall 1, and a partition 11 connecting with the rear end of the partition 10 extends outwardly to a point adjacent the door 8. This provides a compartment 12 within the camera directly back of the lenses 3ª and 4ª and in this compartment are mounted the film moving devices for the camera, most of which form no part of this invention and are, therefore, not shown herein. One of such film moving devices, forms in combination with other elements thereof, a part of my invention and this comprises the continuously driven sprocket 13 receiving its rotary motion by suitable driving connection with the camera driving means (not shown). As a matter of fact, this sprocket 13 is utilized to engage and move the film 14 downwardly from the supply reel in the film magazine 15, thus feeding the film 14 out of said magazine downwardly through the camera past the exposure apertures 7, by suitable intermittent mechanism, for the purpose of photographing images thereon through one or both of the lenses 3ª and 4ª.

A smooth pad 16 is provided at the rear of each of the exposure apertures 7, over which the film 14 moves, and positioned directly to the rear of the apertures 7 and serving as means for holding the film 14 in flat engagement with the pads 16 and therefore, in proper focus with respect to the lenses 3ª and 4ª, are gate members 17 which may be secured within the compartment 12 and adjustable with respect to the film and exposure apertures in any suitable manner. Figure 1 shows one of these gates, and it will be understood of course that there is a duplicate thereof similarly positioned with respect to the lower aperture and lens 4. The gate 17 comprises a hollow housing, the front wall adjacent the film 14 being apertured as at 18 in exact size and alignment with the aperture 7. A reflecting prism 19 is suitably mounted within the gate member 17 in position to receive the image passing through the lens 3ª and reflect the same outwardly at right angles through an opening 20 in the end of the gate member 17. The door 8 is provided with an opening 21 in alignment with the end of the gate member provided with the opening 20, and when the door is closed, it engages with the shoulder portions of the end of the gate member to provide a light tight passage therethrough.

On the inner side of the door 8 is vertically slidably mounted a safety shutter 8ª (see Figures 1, 7 and 8). This shutter is adapted to open or close the passage formed by the openings 20 and 21 and consists of a slide provided with a laterally disposed slot 8ᵇ intermediate its ends adapted to receive a pin 8ᶜ eccentrically carried by a disk 8ᵈ rotatably mounted in a flanged cup like closure 8ᵉ, secured to the door 8 as by screws 8ᶠ and closing an opening 8ᵍ provided in the door 8 for the purpose. The disk 8$^d$ is provided with a stem 8$^h$ extending outwardly and journaled in the bearing 8$^j$ provided in the cup 8$^e$. A handle 8$^k$ is provided on the outer end of the stem 8$^h$ whereby the disk 8$^d$ may be rotated. It will be noted with reference to Figure 7 that the disk 8$^d$ is offset laterally with respect to the slide 8$^a$, whereby upon rotation of the disk, the slide, through the pin and slot connection 8$^b$ and 8$^c$, will be moved vertically. The slide 8$^a$, is provided with an opening 8' adjacent one end, which when the slide is moved upwardly, will uncover the upper openings 20 and 21. When in this position, the lower end of the slide uncovers the lower set of openings 20 and 21 as shown in dotted lines at 8$^m$. When the slide is moved downwardly, the ends of the slide cover both the upper and lower sets of openings 20 and 21, as per the dotted line position 8$^n$.

The door 8 is provided on each side of the opening 21 with outwardly extending parallel walls 22 and 23, forming a compartment 24, the outer end of which is closed by wall 25. Secured to this end wall 25 as by the screw 26 is a block 27 upon which is secured a reflecting prism 28 adapted to catch the reflected image from the prism 19 and reflect the same rearwardly of the camera at right angles for a purpose to be described. Also located within the compartment 24 is a focusing lens system 29 slidable between the walls 22 and 23 and adjustable by means of the screw 30 provided on its inner side with an eccentric pin 31 engaging in a slot 32 in the lens mount. Thus the reflected images from the prism 19 may be accurately and properly focused.

Extending outwardly from the rear edge of the door 8 and parallel with the wall 23 is a wall 33 forming a compartment 34 adapted to be closed by a door 35 hinged as at 36 (see Figure 4). The wall 23 is provided with an opening 37 in alignment with the prism 28 permitting the reflected images from such prism to pass into the compartment 34.

A partition 38 extends between the walls 23 and 33 spaced a short distance from the parallel with the door 8. In the compartment 39 thus formed, is disposed the gearing and driving mechanism for the parts to be described.

Secured upon the partition 38 in a plate or gib 40 (see Figures 1 and 2), and slidable longitudinally upon this gib 40 is the right angled extension 41 of a frame member 42. A clamping plate 43 provided with screws 44 extending into the partition 38 provides means for clamping and holding the frame in its adjusted position. Any suitable adjusting means may be provided for the frame and extension such as the screw 45 provided with an eccentric pin 46 engaging in a slot provided in a shoe 47 carried by the extension 41.

The frame 42 is provided with an aperture 48 of the same size as the aperture 7 and slidably mounted upon the frame 42 directly at the rear edge of said aperture 42 is a ground glass 49 or other focusing screen removably secured in position on the frame by means of spring clips 50 whereby when the ground glass is in position, it is maintained in flat engagement with the frame directly over and flush with the rear edge of the aperture 48.

It will be clear that although the image of the scene visible through the lens 3$^a$ appears upon the film 14 at the exposure aperture 7 in inverted position, such image will by virtue of its reflection by the prism 19 through the lens system 29 and its reflection by the prism 28, appear upon the ground glass 49 right side up, and the same size as on the film at aperture 7.

The rear wall 33 is provided with an aperture 51 in alignment with the ground glass 49 and the aperture 48 in the frame 42. Mounted upon the outer surface of this wall 33 around the aperture 51 is a housing 52 provided with an eye piece 53 and within the housing 52 is disposed a magnifying glass 54 through which the operator may view the image upon the ground glass 49. Thus the image through the lens 3$^a$ is presented to the eye of the operator right side up and magnified by the glass 54 and by properly manipulating the lens 3$^a$ in the usual manner, the same may be focused to present the image sharply upon the film 14. Obviously, if the image is sharp on the film, it will be sharp on the ground glass. The ground glass 49 may be provided with a clear spot 49$^a$, through which a portion of the image may be viewed direct for fine, sharp focusing.

It will be understood of course that there is a similar optical system and focusing means provided for each of the lenses 3$^a$ and 4$^a$. It has not been deemed necessary to duplicate the description of parts for each system inasmuch as they are identical. Figure 2 shows the duplicate frames 42 with their apertures 48, ground glasses 49, and the eye pieces 53 on the housings 52, containing the magnifying glasses 54.

Figure 5:
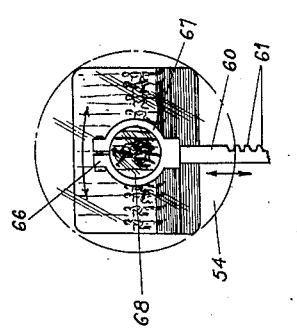
Figure 5 is a detail view illustrating the operation of the scanning magnifier used in focusing.

Suitably journaled in the wall 33 at a point intermediate the two magnifier lens housings 52 is a hollow bearing 55 suitably fixed to the wall 33 by means of the screw plate 56. Rotatably journaled upon this bearing is a sleeve 57 provided at its outer end with a finger piece 58 and at its inner end with a supporting member 59 through which is slidably mounted an arm 60 provided with teeth 61 to form a rack. This rack is held in slidable relation to the supporting member 59 by means of the screw plate 62. Rotatably journaled within the fixed bearing 55 is a shaft 63, the outer end of which is provided with a finger piece 64, and the inner end of which is provided with a pinion 65 engageable with the teeth 61 on the rack 60 whereby upon rotation of the shaft 63, said rack will be moved up or down depending upon the direction of rotation of the shaft 63. The rack 60 carries at its outer end a clamping ring 66 secured within which is a small lens mount 67 within which is suitably mounted a lens 68 (see Figure 5) of a very high degree of magnification. This device constitutes the scanning magnifier and is of great assistance in focusing inasmuch as practically any portion of the image on either ground glass 49 can be thus greatly magnified for viewing through the ordinary magnifying glass 54, and the lenses 3 and 4, depending upon which is being used, focused until the images on the ground glasses 49 are hair sharp as shown through the magnifier 68. The clear spot 49$^a$ assists in this operation. The adjustability of this scanning device makes it possible to cover practically any portion of the image upon which it is desired to focus particularly sharp for obviously rotation of the finger piece 58 will move the scanning lens 68 right or left the length of the image and rotation of the finger piece 64 will move it up or down the desired amount. Of course, by rotating the finger piece 58 a half turn, the scanning device may be shifted from one ground glass 49 to the other.

Mounted upon the partition 38 are a pair of lugs 69 and 70 and mounted upon the wall 35 are a similar pair of lugs 71 and 72. The hollow sleeve 73 is journaled in the wall 33 and in the lug 70 and is provided at its outer end with a finger piece 74 and at its inner end with a frame 75. A shaft 76 passes through the sleeve 73 and is provided at its outer end with a finger piece 77 and it extends at its inner end beyond the lug 70 and is journaled in the lug 69 and carries between such lugs one end of a frame 78. Likewise a sleeve 79 is journaled in the wall 33 and extends inwardly to the lug 72 and is provided at its outer end with a finger piece 80 and at its inner end with a frame 81. A shaft 82 extends through this sleeve and is provided at its outer end with a finger piece 83 and at its inner end with a frame 84. These frames 75, 78, 81 and 84 are adapted to carry color screens such as indicated in Figure 3 at 85. The frames are provided adjacent their pivoted ends with squared surfaces 86 adapted to engage a flat leaf spring 87 suitably anchored to the wall 35 as by means of screws 88. The normal position of the screws as shown in Figure 3, is out of alignment with the focusing magnifier 54 but by manipulation of the finger pieces 74, 77, 80 or 83, any one of the screens can be interposed in the path between the images on the ground glass and focusing magnifiers. Thus there is provided a means whereby the operator may at will gauge the light value for photographing a particular scene through either or both lenses of the camera as regards color sensitivity, depending upon the type of film used.

In order that the operator may control the passage of the reflected images from the prisms 28 to the ground glasses 49 for the purpose of focusing, and in order that the paths of such images therebetween may be normally closed when the focus is completed and the pictures being taken, and for other purposes as will appear later, I have provided a shutter member for each of the apertures 37 in the wall 23, such shutters being indicated at 89 (see Figures 1 and 2), disposed adjacent and directly in front of the apertures 37 and provided with an angular extension 90 secured upon a pintle 91 rotatably journaled in the end wall 25 closing the compartments 24. Secured to the outer extending end of the pintle 91 is a cup-like housing 92 surrounding the bearing 94 for the pintle 91 and within which housing is disposed a coil spring 93 also encircling said bearing and having one end attached thereto, and the opposite end attached to the housing 92, whereby to normally urge it in one direction. The tendency of the spring 94 is to rotate the shutter 89 to a position uncovering the aperture 37. The housing 92 carries at its end an enlarged portion 95 within which is a spring pressed pin 96, the inner end of which normally lies in position to engage a fixed pin 97 on the end wall 25. The operation of this device is as follows:—If it is desired to merely uncover the aperture 37 momentarily to observe the image on the ground glass 49, the operator merely presses downwardly on the outer end of the spring pressed pin 96, thus rotating the housing 92 against the tension of the coil spring 94. This will move the shutter blade 89 downwardly out of alignment with the aperture 37. Immediately upon release of the housing, the spring will of course return the same to its normal position, namely, with the inner end of the pin 96 in engagement with the pin 97. If it is desired to move the shutter 89 out of alignment with the aperture 37 and have it stay in such removed position without holding it there, the operator pulls outwardly on the spring pressed pin 96, thus disengaging the inner end thereof from the pin 97, whereupon the coil spring 94 rotates the housing 92 and the shutter 89 upwardly or to the left in Figure 2, thus uncovering the aperture 37. The spring 94 will keep the shutter in such position until such time as it is returned manually by reversing the operation just described. In normal operation of the camera in the taking of the pictures through the main lenses 3ª and/or 4ª, the shutter 89 will close the aperture 37 so as to prevent any possible leakage of light through such aperture and through the prisms 28 and 19, and lens 29, to the rear side of the film. If, however, it is desired to photograph scenes upon the rear side of the film 14 through this optical system, in a manner about to be described, the shutter 89 will be left in its open or uncovering position.

As set forth in the preliminary and general description of this invention, it contemplates utilizing the optical systems heretofore described, not only for focusing properly through the lenses 3ª and 4ª, but also utilizing such optical systems for the purpose of photographing upon the rear side of the film 14 either simultaneously with or independently of the photographing through the lenses 3 and 4, of supplemental scenes or images, provided by means of mats, masks or the like. The means for carrying out this portion of the invention will now be described.

The frames 42 provided for carrying the ground glasses 49 are as before stated provided with the spring clips 50 for removably holding the ground glass 49 in position. These clips can also be utilized when the ground glass 49 is removed, to hold in position a slide of glass or other suitable material bearing certain images or scenes or masks which it is desired to photograph upon the film 14. Such scenes or masks are shown at 49ᵇ in Figures 9 and 10. These frames 42 are likewise provided, as shown clearly in Figure 2, with slots or guideways 98 and 99 adapted to receive the slides 100, which may be in the form of curtains, masks, mats or other devices for affecting the appearance of any image or scene which may be substituted for the ground glass 49. Such slides 100 are illustrated clearly in Figures 12 to 15 inclusive. Sources of light as indicated by the lamps 101 are provided in the compartment 34 for the purpose of illuminating such scenes or images 49ᵇ substituted for the ground glass 49, and obviously upon illumination such images or scenes will be reflected by the prism 28 through the lens system 29 to the prism 19 and to the film 14.

Of course in order that the photographing of such supplemental scenes be intermittent and timed with the intermittent movement of the film 14 past the exposure apertures 7, I have provided shutters between the frames 42 and the apertures 37, such a shutter comprising a rotatable drum 102 provided with oppositely disposed apertures 103, adapted upon rotation of the drum to intermittently cover and uncover the path of light between the frames 42 and the aperture 37. The drum 102 is mounted upon a shaft 104 extending through the partition 38 into the compartment 39. A gear 105 is mounted upon the shaft in this compartment and meshes with a gear 106 secured on a shaft 107 journaled in a bearing on the inside of the door 8. The shaft 107 is provided at its outer end with a disk 109 provided with a pair of spaced openings or recesses 110 adapted to receive a pair of pins 111 carried on the end of the sprocket 13. These pins 111 are as shown clearly in Figure 4, slidable within recesses 112 in the sprocket 13 and are normally pressed outwardly by means of coil springs 113 encircling the pins and engaging against shoulders 114 thereon. The purpose of this arrangement is for permitting the closing of the door 8 regardless of the alignment of the pins 111 and recesses 110, for obviously upon initial rotation of the sprocket 13, the pins 111 will drop into the recesses 110 as soon as they reach them. This eliminates the necessity of lining up the disk 109 and the sprocket 13 before closing the door 8.

A gear 106 meshes with a gear 115 on shaft 116 suitably journaled in the partition 38. Gear 115 meshes with gear 117 on shaft 118, also journaled in the partition 38. Gear 117 meshes with gear 119 on a shaft 120, on which shaft is mounted the lower shutter drum 102, identical with that illustrated for the upper shutter in Figures 1 and 4. Thus, there is provided a driving means from a driven part of the camera for the shutters 102 whereby the scenes or images carried by the frames 42 may be intermittently exposed upon the rear side of the film 14.

The shutter drums 102 rotate within closed housings 121 secured to the partition 38 by means of screws 122 as shown clearly in Figure 4. This housing 121 is of course provided on opposite sides in alignment with the frames 42 and the exposure apertures 37, with apertures 123. Rotatable around the outer surface of the circular housing 121 is a masking or dissolving shutter 124. This may be provided with oppositely disposed apertures for alignment with the apertures 123 and the edges of such aperture may be any desired shape or contour, such as for instance, arcuate, as indicated at 125. Thus if it be desired to close the aperture 123 gradually with a curved edge, that is while the scene is being photographed, this shutter 124 may be rotated to bring the curved edge of its aperture over the aperture 124.

A second shutter mask 126 is rotatable over the shutter mask 124, and is provided with an aperture adapted to align with the aperture 123, and the edges of which may be of a different configuration, such as for instance, V-shaped as shown at 127 in Figure 4.

Obviously, many different effects can be provided by manipulating these shutter masks during the photographing of the scenes and in order to secure additional effects such as for instance changing from one optical system to another, I have provided operating means for these shutter masks, whereby they may be operated by the cameraman from the outside during the operation of the camera, either independently and individually or in pairs for changing from one optical system to the other. This operating means is shown in Figures 2 and 4. A rod 128 is slidable through the top wall 129 of the compartment 34 and extends downwardly into such compartment, and is provided with a link connection 130 with the inner shutter mask 124. Any suitable operative connection may be made, whereby upon moving the rod 128 up or down, the shutter mask 124 will be rotated. Slidable upon the lower end of the rod 128 is a sleeve 131, the lower end of which has a link connection 132 with the lower inner shutter mask 124. A set screw 133 is provided whereby the sleeve and rod may be secured together, whereupon movement of the rod by means of the finger piece 134 will operate both of said shutter masks 124 simultaneously.

A second rod 135 extends upwardly into the compartment 34 through the bottom wall thereof, and is provided at its inner end with a link connection 136 with the outer shutter mask 126 whereby upon movement in or out of the rod 136 by means of the finger piece 137, such shutter mask will be rotated. A sleeve 138 encircles the rod 135 and is provided with a link connection 139 with the lower outer shutter mask 126. A set screw 140 provides means for securing the sleeve 138 and the rod 135 together, whereby both of the outer shutter masks may be operated simultaneously. A link 141 is pivoted centrally as at 142 and is connected at one end with the sleeve 131 and at the opposite end with the sleeve 138. Set screws 143 and 144 provide means for securing the ends of the link to the respective sleeves. This provides additional means for various combinations of shutter mask operations as may be required or as the cameraman may desire.

I have provided an additional curtain shutter mask between the frames 42 and the apertures 37, in the form of a flat plate 145 slidable directly adjacent the frames 42 by means of a screw rod 146 operable by a finger piece 147, whereby the plate 145 may be moved upwardly or downwardly to simultaneously cover one exposure aperture 48 in one of the frames 42, and uncover the exposure aperture 48 in the other frame 42.

Mounted upon the wall 22 are view finders 148 illustrated generally in Figure 1 and the details of which are not herein shown nor described.

Another feature of my camera is illustrated in Figure 2 and consists in providing in the bottom wall 35, an opening 149 through which may be passed a pointer 150 or other instrument, the end of which may be placed at a desired spot on the scene 49$^b$ which may be substituted for the ground glass 49. Thus the photograph of the scene will likewise show the pointer, which of course is illuminated from the rear by the lights 101.

It will thus be seen that I have provided for a double lens motion picture camera, means for rendering such camera unusually effective by taking advantage of conditions peculiar to a double lens camera by the provision of novel optical systems adaptable for accurate focusing of both lenses, and in addition adaptable for the photographing upon the back of the film supplementary scenes or images through one or both optical systems, whereby trick motion pictures and scenic effects may be produced in a single camera of this type with continuous taking such as would not be possible with a single lens camera, nor with a double lens camera without my improvements as herein set forth. It will be noted however, that many of the features herein described are equally adaptable to a single lens camera.

It will be understood of course, that many changes in details of construction and arrangement of parts may be made without departing from the spirit and scope of my invention. I do not limit myself therefore, to the exact form herein shown and described other than by the appended claims.

I claim:

1. A motion picture camera including a main lens for photographing upon one side of a film, means on the opposite side of the film for observing the focus of said lens through the film, including an optical system provided with a focusing screen for the film image, a magnifier for observing said screen and an adjustable supplemental magnifier for observing a selected portion of said screen.

2. A motion picture camera including a main lens for photographing upon one side of a film, means on the opposite side of the film for observing the focus of said lens through the film, including an optical system provided with means for reinverting the film image for observation, a focusing screen for said image, a magnifier for observing said screen, and an adjustable supplemental magnifier for observing a selected portion of said screen.

3. A motion picture camera including a main lens for photographing upon one side of a film, means on the opposite side of the film for observing the focus of said lens through the film, including an optical system provided with a focusing screen for said film image, a magnifier for observing said screen, and a supplemental magnifier for observing a selected portion of said screen, said supplemental magnifier being adjustable for scanning said screen.

4. A motion picture camera including a pair of main lenses for photographing upon one side of a film, means on the opposite side of the film for observing the focus of said lenses through the film, including a pair of optical systems provided with focusing screens for the film images, magnifiers for observing said screens, and an adjustable supplemental magnifier for observing a selected portion of either of said images.

5. A motion picture camera including a pair of main lenses for photographing upon one side of a film, means on the opposite side of the film for observing the focus of said lenses through the film, including a pair of optical systems provided with means for reinverting the film images for observation, focusing screens for said images, magnifiers for observing said screens, and an adjustable supplemental magnifier for observing a selected portion of either of said images.

6. A motion picture camera including a pair of main lenses for photographing upon one side of a film, means on the opposite side of the film for observing the focus of each of said lenses through the film, including a pair of optical systems provided with focusing screens for the film images, magnifiers for observing each of said screens, and a supplemental magnifier for observing a portion of said images, said supplemental magnifier being mounted between said optical systems and movable into the optical axis of either of said screens.

7. A motion picture camera including a pair of main lenses for photographing upon one side of a film, means on the opposite side of the film for observing the focus of each of said lenses through the film, including a pair of optical systems provided with focusing screens for the film images, magnifiers for observing each of said screens, and a supplemental magnifier for observing a portion of said images, said supplemental magnifier being mounted between said optical systems and movable into the optical axis of either of said screens, and adjustable for scanning each of them.

8. A motion picture camera including a pair of main lenses for photographing upon one side of a film, means on the opposite side of the film for observing the focus of each of said lenses through the film, including a pair of optical systems provided with focusing screens for the film images, magnifiers for observing each of said screens, and a supplemental magnifier for observing a portion of said images, said supplemental magnifier being mounted between said optical systems and movable into the optical axis of either of said screens, and adjustable for scanning each of them, and means for moving said supplemental magnifier out of operative position with respect to both of said screens.

9. A motion picture camera including a pair of main lenses for photographing upon one side of a film, means on the opposite side of the film for observing the focus of each of said lenses through the film, including a pair of optical systems provided with focusing screens for the film images, magnifiers for observing each of said screens, and a supplemental magnifier for observing a portion of said images, said supplemental magnifier being mounted between said optical systems and movable into the optical axis of either of said screens, and adjustable for scanning each of them, and means for moving said supplemental magnifier out of operative position with respect to both of said screens, said supplemental magnifier being operable from outside the camera.

10. Focusing means for a photographic camera comprising a lens for photographing images on a film, means including a magnifier on the opposite side of the film for observing the film image, and a supplemental magnifier adjustable to scan the image to permit observation of selected enlarged portions thereof.

11. A motion picture camera, including a main lens for photographing upon one side of a film, means on the opposite side of the film for observing the focus of said lens through the film, including an optical system comprising a prism for reflecting the film image laterally, a lens through which the reflected image passes and by which it is reinverted, a second prism for reflecting said image again laterally, a focusing screen for said image, a magnifier for observing said screen image, and a supplemental magnifier for observing an enlarged portion only of said screen image.

12. A motion picture camera, including a main lens for photographing upon one side of a film, means on the opposite side of the film for observing the focus of said lens through the film, including an optical system comprising a prism for reflecting the film image laterally, a lens through which the reflected image passes and by which it is reinverted, a second prism for reflecting said image again laterally, a focusing screen for said image, a magnifier for observing said screen image, and a supplemental magnifier for observing an enlarged portion only of said screen image, said supplemental magnifier being adjustable for scanning said screen image.

13. A motion picture camera including a pair of main lenses for photographing on one side of a film, an optical system for each main lens, including a supplementary lens, communicating with the opposite side of the film, frames positioned in the paths of said optical systems at the points of focus of said supplementary lenses, and having means for receiving image devices to be photographed on the opposite side of the film from said lenses, and a sliding shutter member cooperating with both said optical systems and operable to simultaneously open one path and close the other.

14. A motion picture camera including a main lens for photographing on one side of a film, a camera casing, a hinged door thereon, an auxiliary casing on said door, and means in said auxiliary casing including a shutter and an optical system communicating through said door for photographing upon the opposite side of the film from said main lens, a driven member in said camera casing, means carried in said supplemental casing for driving said shutter, and means carried by said door for operatively connecting said driven member and said driving means.

15. A motion picture camera including a main lens for photographing on one side of a film, a camera casing, a hinged door thereon, an auxiliary casing on said door, and means in said auxiliary casing including a shutter and an optical system communicating through said door for photographing upon the opposite side of the film from said main lens, a driven member in said camera casing, means carried in said supplemental casing for driving said shutter, and means carried by said door for operatively connecting said driven member and said driving means, said connection being automatically established upon closing said door and starting the operation of said driven member.

16. A motion picture camera including a main lens for photographing on one side of a film, a camera casing, a hinged door thereon, an auxiliary casing on said door, and means in said auxiliary casing including a shutter and an optical system communicating through said door for photographing upon the opposite side of the film from said main lens, a driven member in said camera casing, means carried in said supplemental casing for driving said shutter, and means carried by said door for operatively connecting said driven member and said driving means, said connection being automatically established upon closing said door and starting the operation of said driven member, said connecting means comprising a rotatable member provided with openings, and spring pressed pins on said driven member adapted to engage in said openings.

17. A motion picture camera including a pair of fixed spaced main lenses for photographing on one side of a film, a camera casing, a hinged door thereon, an auxiliary casing on said door, and means in said auxiliary casing including a pair of shutters and a pair of optical systems each communicating through separate openings in said door for photographing upon the opposite side of the film from said main lenses each optical system being complementary to one of said main lenses.

18. A motion picture camera including a pair of fixed spaced main lenses for photographing on one side of a film, a camera casing, a hinged door thereon, an auxiliary casing on said door, and means in said auxiliary casing including a pair of shutters and a pair of optical systems each communicating through separate openings in said door for photographing upon the opposite side of the film from said main lenses each optical system being complementary to one of said main lenses, a driven member in said camera casing, means in said supplemental casing for driving said shutters, and means carried by said door for operatively connecting said driven member and said driving means.

19. A motion picture camera including a pair of fixed spaced main lenses for photographing on one side of a film, a camera casing, a hinged door thereon, an auxiliary casing on said door, and means in said auxiliary casing including a pair of shutters and a pair of optical systems each communicating through separate openings in said door for photographing upon the opposite side of the film from said main lenses each optical system being complementary to one of said main lenses, a driven member in said camera casing, means in said supplemental casing for driving said shutters, and means carried by said door for operatively connecting said driven member and said driving means, and a hinged closure for said auxiliary casing.

20. A motion picture camera including a pair of fixed spaced main lenses for photographing on one side of a film, a camera casing, a hinged door thereon, an auxiliary casing on said door, and means in said auxiliary casing including a pair of shutters and a pair of optical systems each communicating through separate openings in said door for photographing upon the opposite side of the film from said main lenses each optical system being complementary to one of said main lenses, and a shutter member on said door for selectively opening and closing said openings.

21. A motion picture camera including a pair of fixed spaced main lenses for photographing on one side of a film, a camera casing, a hinged door thereon, an auxiliary casing on said door, and means in said auxiliary casing including a pair of shutters and a pair of optical systems each communicating through separate openings in said door for photographing upon the opposite side of the film from said main lenses each optical system being complementary to one of said main lenses, and a shutter member on said door for selectively opening and closing said openings, and manually operable means for said shutter operable outside said camera.

FREEMAN H. OWENS.